(12) United States Patent
Nagumo

(10) Patent No.: US 7,633,636 B2
(45) Date of Patent: Dec. 15, 2009

(54) IMAGE FORMING APPARATUS AND SCREEN TRANSITION CONTROL METHOD

(75) Inventor: Jun Nagumo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 690 days.

(21) Appl. No.: 11/399,487

(22) Filed: Apr. 7, 2006

(65) Prior Publication Data
US 2006/0248473 A1    Nov. 2, 2006

(30) Foreign Application Priority Data
Apr. 28, 2005    (JP)    ............... 2005-130785

(51) Int. Cl.
*G06K 15/00*    (2006.01)
(52) U.S. Cl. ............... 358/1.13; 358/1.15; 715/764; 715/765; 399/81; 399/85
(58) Field of Classification Search ............... 358/1.9, 358/1.13, 1.14, 1.15, 1.16; 399/81, 85; 715/734, 715/764, 765, 808
See application file for complete search history.

(56) References Cited

U.S. PATENT DOCUMENTS

| | | | | |
|---|---|---|---|---|
| 5,049,931 | A | * | 9/1991 | Knodt ............... 399/81 |
| 5,630,079 | A | * | 5/1997 | McLaughlin ............... 715/734 |
| 6,761,308 | B1 | * | 7/2004 | Hanna et al. ............... 235/379 |
| 2003/0011800 | A1 | * | 1/2003 | Miyahara et al. ............... 358/1.13 |
| 2006/0061808 | A1 | * | 3/2006 | Miyahara et al. ............... 358/1.15 |

FOREIGN PATENT DOCUMENTS

| | | |
|---|---|---|
| JP | B2 2887864 | 2/1999 |
| KR | A-2003-28584 | 4/2003 |
| KR | A-2005-1259 | 1/2005 |

\* cited by examiner

*Primary Examiner*—Kimberly A Williams
(74) *Attorney, Agent, or Firm*—Oliff & Berridge, PLC

(57) ABSTRACT

An image forming apparatus that performs a plurality of functions includes: a display which displays a menu screen or a function instruction screen, the menu screen being used for selecting one of the plurality of functions, and the function instruction screen corresponding to each of the functions and being used for executing the corresponding function; an operating section which accepts an operation relating the selected function from a user; a detecting section which detects that an operation relating to the selected function has not been performed for a predetermined amount of time; and a controller which controls a screen transition to change the screen of the display to an initial screen of the function instruction screen corresponding to the selected function, when the detecting section detects that the operation has not been performed for the predetermined amount of time.

8 Claims, 5 Drawing Sheets

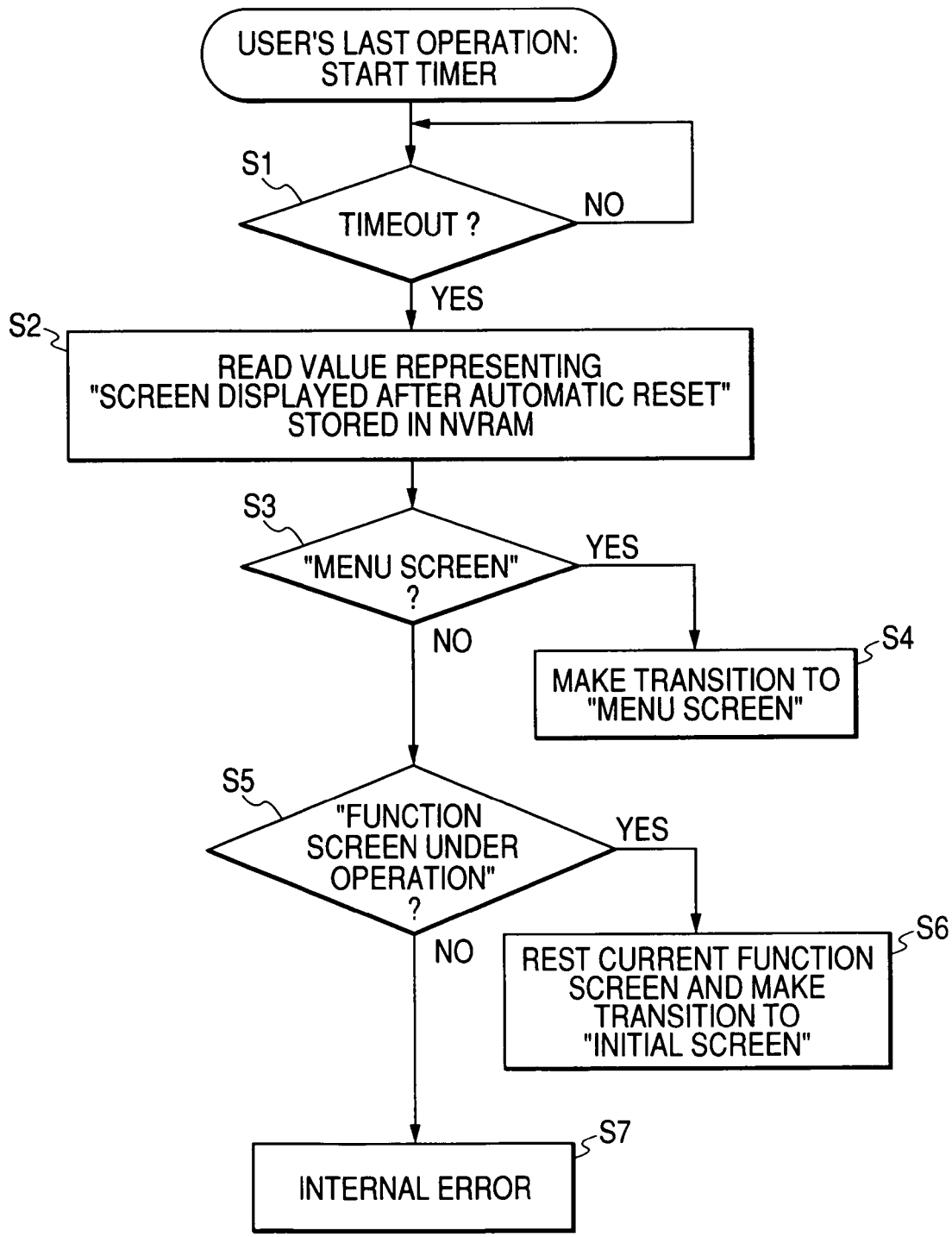

IMAGE FORMING APPARATUS AND SCREEN TRANSITION CONTROL METHOD

This application claims foreign priority based on Japanese Patent application No. 2005-130785, filed Apr. 28, 2005, the content of which is incorporated herein by reference in its entirety.

BACKGROUND

1. Technical Field

The present invention relates to an image forming apparatus having various image forming functions such as a copying function and a facsimile function, and a screen transition control method thereof. More particularly, the present invention relates to an image forming apparatus and a screen transition control method thereof in which a screen transition considering usability of a user is realized.

2. Related Art

It is know that in a copying machine having a copying function and a facsimile function, a copying mode or a facsimile mode is selected for an initial mode of the copying machine upon initialization, and in a case where the copying machine is not operated for a predetermined amount of time or more, a screen of the copying machine is returned to the preliminarily selected initial mode. Thus, selection of the function suited to a type of usage of the copying machine can be performed.

SUMMARY

According to an aspect of the invention, an image forming apparatus that performs a plurality of functions includes: a display which displays a menu screen or a function instruction screen, the menu screen being used for selecting one of the plurality of functions, and the function instruction screen corresponding to each of the functions and being used for executing the corresponding function; an operating section which accepts an operation relating the selected function from a user; a detecting section which detects that an operation relating to the selected function has not been performed for a predetermined amount of time; and a controller which controls a screen transition to change the screen of the display to an initial screen of the function instruction screen corresponding to the selected function, when the detecting section detects that the operation has not been performed for the predetermined amount of time.

BRIEF DESCRIPTION OF THE DRAWINGS

Exemplary embodiments of the present invention will be described in detail based on the following figures, wherein:

FIG. 2 is a flowchart illustrating a process of controlling a screen transition;

DETAILED DESCRIPTION

Figure 1:
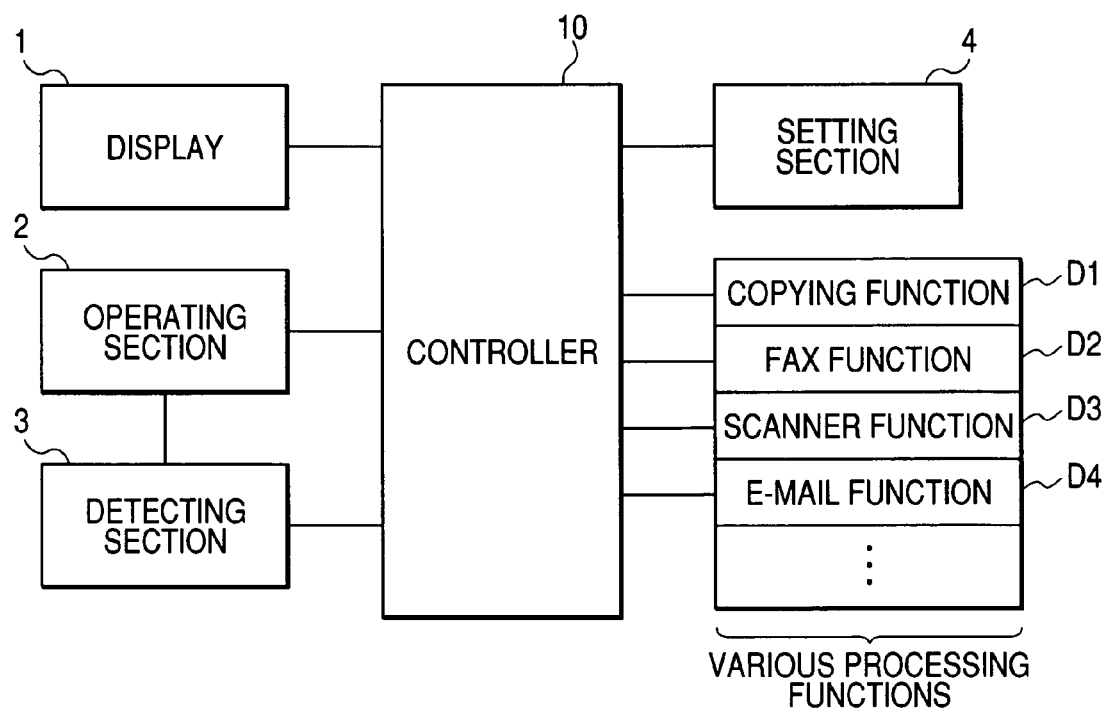
FIG. 1 is a block diagram illustrating an image forming apparatus according to an embodiment of the invention.

Hereinafter, an embodiment of the invention is described with reference to the accompanying drawings. FIG. 1 is a block diagram illustrating an image forming apparatus according to this embodiment of the invention. The image forming apparatus according to this embodiment is what is called a multifunction apparatus having various processing functions such as a copying function D1, a FAX (facsimile) function D2, a scanner function D3 and an e-mail function D4. This embodiment relates to a screen transition in a display 1 of the image forming apparatus.

The image forming apparatus includes: the display 1 having a touch panel display device which displays a menu screen and a function instruction screen used for executing various processing functions; an operating section which accepts a button operation of a user; a detecting section 3 which detects that the operation is not performed in operating section 2 for a predetermined amount of time; a setting section 4 which performs various screen settings and has a NVRAM (Non-Volatile RAM) adapted to store content of the setting; and a controller 10 which performs a control of the transition of a screen displayed in the display 1 and a control of each of the sections.

Incidentally, in the image forming apparatus according to this embodiment, a process performed when a power is turned on is referred to as a power-on process. A mode in which a reset process is performed without power-saving when the predetermined amount of time (a first predetermined amount of time) passes without an operation being performed in the operating section 2 is referred to as an automatic reset mode. A mode in which a power-saving is performed when the predetermined amount of time (a second predetermined amount of time) passes without an operation being performed in the operating section 2 is referred to as a power-saving mode. A mode in which a supply of electric power is started when an operation mode of the apparatus returns from the power-saving mode, is referred to as a return mode.

In the image forming apparatus according to this embodiment, in a case where a transition of the operation mode of the apparatus is made to the automatic reset mode in the display 1 by the controller 10, when the detecting section 3 detects the lapse of the first predetermined amount of time, the controller 10 controls to return the screen of the display 1 to an initial screen of the function instruction screen corresponding to the processing function selected immediately before the transition of the operation mode to the automatic reset mode.

For example, in a case where the predetermined amount of time passes while the operation is not performed in the operating section 2 after a user selects the copying function D1 and a copying process is executed, the detecting section 3 detects that the operation is not performed for the predetermined amount of time, and notify the controller 10 of the detection. Then, the controller 10 performs the control of making the transition of the operation mode to the automatic reset mode. At that time, an initial screen corresponding to the copying function D1 performed before then is displayed in the display 1. Also, various settings relating to the copying function D are reset. Thus, the transition to the automatic reset mode is made by detecting that the operation has not been performed in the operating section 2 for the predetermined amount of time. In this state, a processing function to be performed next is mostly the processing function performed before the transition to the automatic reset mode is made.

Therefore, the initial screen corresponding to the processing function of which usage frequency by users is considered to be high is displayed in the display 1 when the transition to the automatic reset mode is made. Thus, when the processing function is to be performed next, that is, the copying function D1 in this case, the processing function can immediately be performed.

Moreover, in this embodiment, a screen to which the screen transition is made when the transition of the operation mode to the automatic reset mode is made can be preliminarily specified in the setting section 4. For instance, as previously described, the initial screen of the processing function selected before the transition of the operation mode to the automatic reset mode is made can be set as the above screen. Also, the menu screen used for selecting various processing functions can be set as the above screen. In this case, the controller 10 controls the screen transition in the automatic reset mode according to the setting stored in the setting section 4. Consequently, the screen to be displayed in the automatic reset mode can be determined according to the setting suited to a usage condition of a user. Thus, the usability of the apparatus can be enhanced.

FIG. 2 is a flowchart illustrating a control of a screen transition. First, upon completion of the last operation made by a user, a timer is started to thereby start measurement of the predetermined amount of time. Then, it is determined in step S1 whether a timeout occurs. If the detecting section 3 detects the timeout, that is, the predetermined amount of time elapsed, the controller 10 reads a value representing the "screen displayed after the automatic reset" stored in the setting section 4 including the NVRAM in step S2.

Subsequently, it is determined in step S3 whether the read value representing the "screen displayed after the automatic reset" matches with a value representing the "menu screen". If the read value matches with the value representing the "menu screen", the transition of the screen displayed in the display 1 to the "menu screen" is made in step S4.

On the other hand, if the read value representing the "screen displayed after the automatic reset" does not match with the value representing the "menu screen", it is determined in step S5 whether the read value representing the "screen displayed after the automatic reset" matches with a value representing the "function screen under operation". If the read value matches with the value representing the "function screen under operation", the current function screen is reset, and the transition of the screen displayed in the display 1 to the "initial screen" of that function is made in step S6.

If no screens are set, it is determined in step S7 that an internal error occurs. Incidentally, in a case where no screens are set in the setting section 4, the initial screen of the current processing function may be automatically displayed as internal error processing.

Figure 3A:
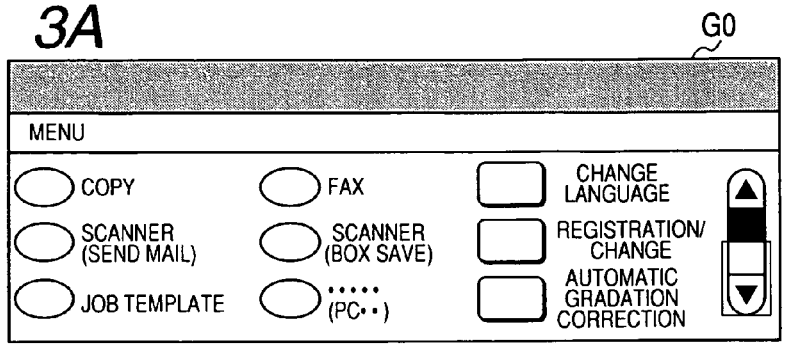
FIGS. 3A to 3D are schematic diagrams illustrating examples of the screen transition.

FIGS. 3A to 3D are schematic diagrams illustrating examples of the screen transition. First, FIG. 3A is a schematic diagram illustrating a menu screen G0. The menu screen G0 is configured so that icons corresponding to various functions performed by the multifunction apparatus serving as the image forming apparatus are displayed thereon, and that a user can select a desired one of the icons. In addition to the icons used to select one of the various functions, the menu screen G0 is provided with icons used to change language and to perform the screen transition to a screen used for registration and change of various settings.

Figure 3B:
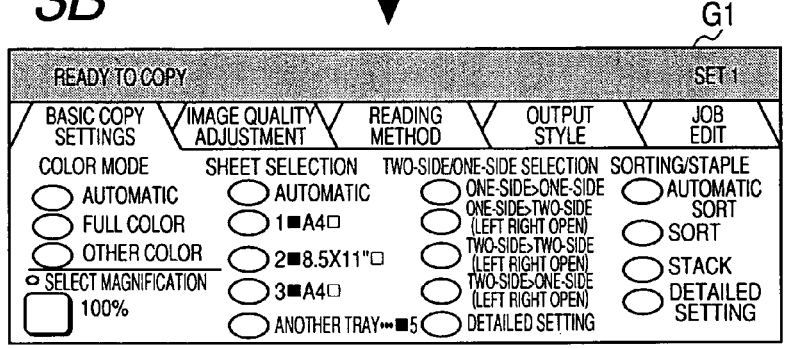

When a user selects the icon representing "COPY" on the menu screen G0, for example, an initial screen G1 of the copying process is displayed as illustrated in FIG. 3B. The initial screen G1 of the copying process is provided with a plurality of tab menus such as "BASIC COPY SETTINGS", "IMAGE QUALITY ADJUSTMENT", "READING METHOD", "OUTPUT FORMAT", and "JOB EDIT". The display of the screen can be changed by selecting a corresponding tab. Since initial values of various items are preliminarily set, the copying process can immediately be performed by using the initial values in a state in which this initial screen G1 is displayed.

Figure 3C:
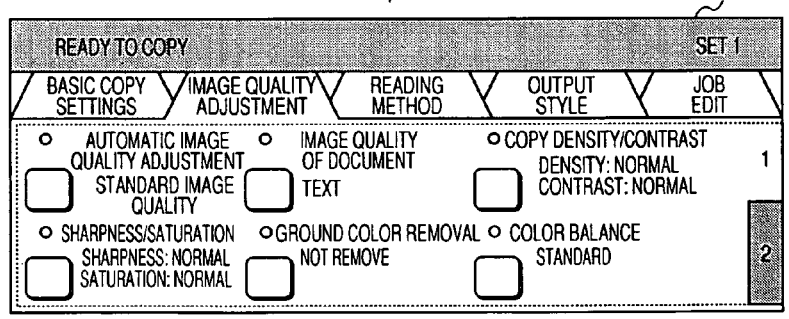
Figure 3D:
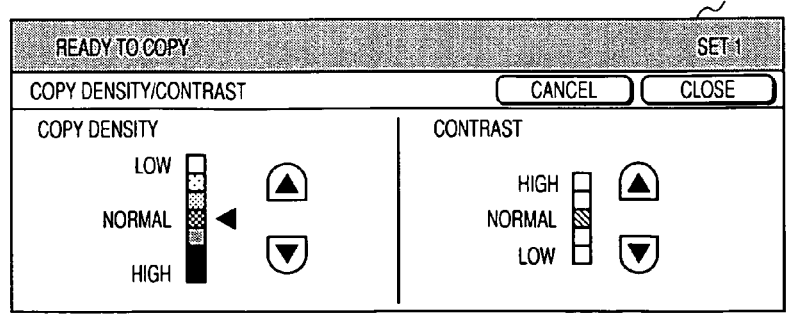

FIG. 3C shows an example of an image quality adjustment screen G11 in the case of selecting a tab of image quality adjustment on the initial screen G1. Even in a state in which this image quality adjustment screen G11 is displayed, the copying process can be performed. In this example, icons used for various image quality adjustments are displayed on this screen. FIG. 3D shows a copy-density/contrast adjustment screen G111 displayed in the case of selecting the icon used for adjusting the copy-density/contrast on the image quality adjustment screen G11 shown in FIG. 3C. Consequently, the copy density and the contrast can be set at a high value or at a low value or the like as a user desires. Even in a state in which the copy-density/contrast adjustment screen G111 is displayed, the copying process can be performed.

According to this embodiment, the copying process is performed by using, for example, the image quality adjustment screen G11 and the copy-density/contrast adjustment screen G111 for the copying process which are respectively shown in FIGS. 3C and 3D. Thereafter, when the operation is not performed for the predetermined amount of time in that state, the transition of the operation mode of the apparatus to the automatic reset mode is made in which various settings are reset. Then, the screen transition to the initial screen G1 of the copying process is performed. Consequently, in the automatic reset mode, the screen is invariably returned to the initial screen G1 of the copying process, that is, the initial screen G1 of the processing function having been performed until then, regardless of the hierarchy of the displayed screen. Thus, when the processing is performed next time, the copying process can immediately be performed without selecting the icon of the copying process on the menu screen G0 again.

Although the screen transition in the case of the copying process is described in the foregoing description of this embodiment, a case of selecting other processing function is similar to the above case. When the operation mode of the apparatus is changed to the automatic reset mode, various settings for the processing function being selected at that time are reset, and the screen is returned to the initial screen of the selected processing function.

The image forming apparatus according to the invention may be controlled so that even at the screen transition in the power-on mode and the return mode, the screen is returned to the initial screen of the processing function being selected until then, similarly to the screen transition in the automatic reset mode.

Consequently, in a case where a certain processing instruction is given to the apparatus in the state that the transition is made to the power-saving mode so as to resume the supply of electric power, and the apparatus is put into the return mode, the screen to be displayed is returned to the initial screen of the processing function being performed until immediately before the transition of the operation mode of the apparatus to the power-saving mode is made. Thus, the processing function of which frequency of usage is considered to be high can immediately be performed.

The user (for example, a machine manager) preliminarily sets the screen transition in the power-on mode and the return mode in the setting section 4. Consequently, the controller 10 can control the screen transition according to the usage condition of the user.

Figure 4:
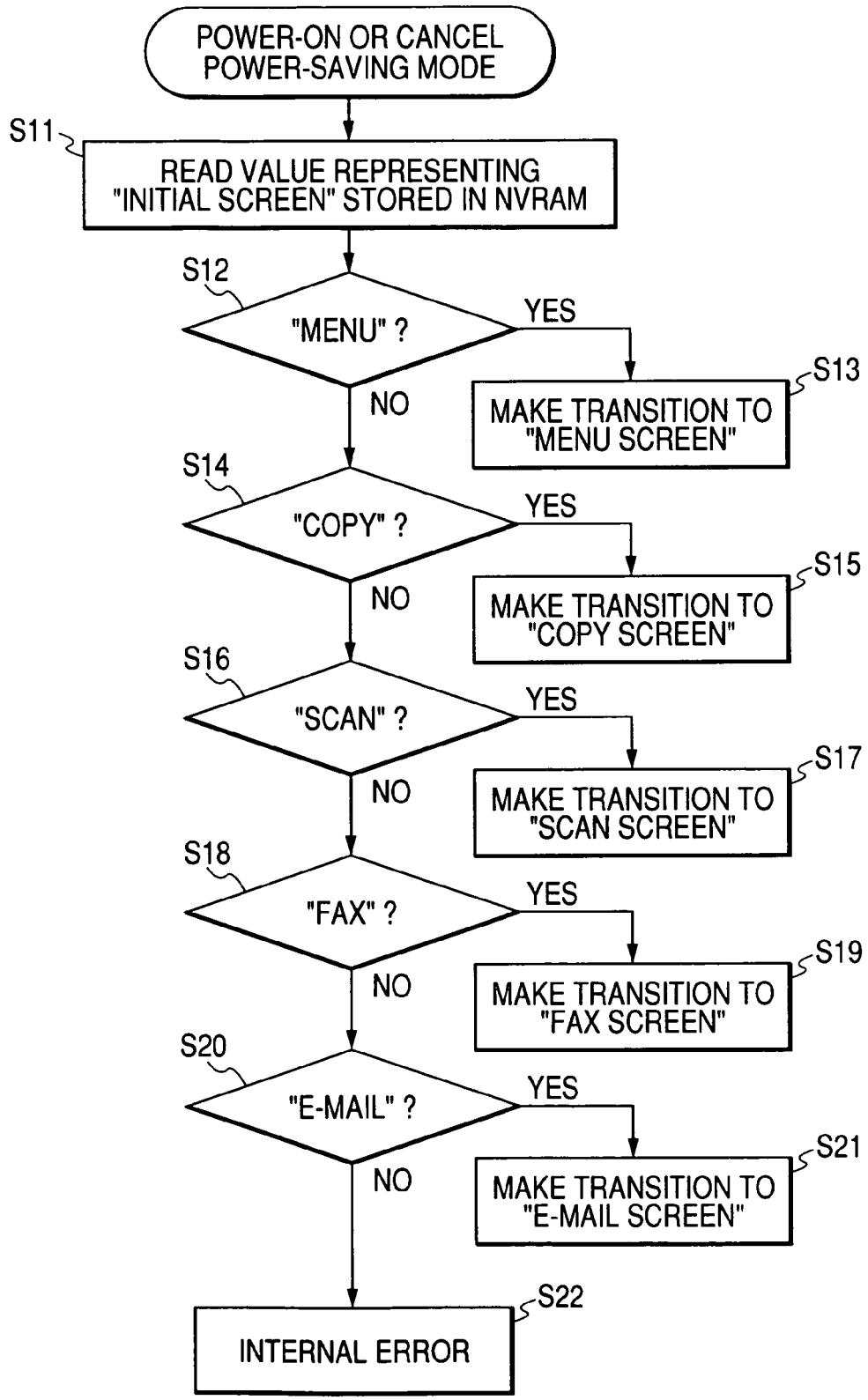
FIG. 4 is a flowchart illustrating a process of controlling a screen transition in a power-on mode or a canceling power-saving mode.

FIG. 4 is a flowchart illustrating a control of the screen transition in the power-on mode or the canceling power-saving mode. First, in a case where the apparatus is put into the power-on mode or the canceling power-saving mode, the controller 10 reads the value representing the "initial screen" which is stored in the setting section 4 including the NVRAM in step S11. Then, it is determined in step S12 whether the read value representing the "initial screen" matches with a value representing the "menu". If the read value matches with the value representing the "menu", the transition of the screen displayed in the display 1 to the "menu screen" is made in step S13.

On the other hand, if the read value representing the "initial screen" does not matches with the value representing the "menu", it is determined in step S14 whether the read value representing the "initial screen" matches with the value representing the "copy". If the read value matches with the value representing the "copy", the transition of the screen displayed in the display 1 to an initial screen of a "copy screen" is made in step S15.

On the other hand, if the read value representing the "initial screen" does not match with the value representing the "copy", it is determined in step S16 whether the read value representing the "initial screen" matches with the value representing the "scan". If the read value matches with the value representing the "scan", the transition of the screen displayed in the display 1 to an initial screen of a "scan screen" is made in step S17.

On the other hand, if the read value representing the "initial screen" does not match with the value representing the "scan", it is determined in step S18 whether the read value representing the "initial screen" matches with the value representing the "FAX". If the read value matches with the value representing the "FAX", the transition of the screen displayed in the display 1 to an initial screen of a "FAX screen" is made in step S19.

On the other hand, if the read value representing the "initial screen" does not match with the value representing the "FAX", it is determined in step S20 whether the read value representing the "initial screen" matches with the value representing the "e-mail". If the read value matches with the value representing the "e-mail", the transition of the screen displayed in the display 1 to an initial screen of an "e-mail screen" is made in step S21. Here, if the read value is other than the "e-mail", it is determined in step S22 that an internal error occurs. Incidentally, in a case where no screens are set in the setting section 4, the initial screen of the processing function being performed until immediately before the transition of the operation mode may be automatically performed as internal error processing.

Figure 5:
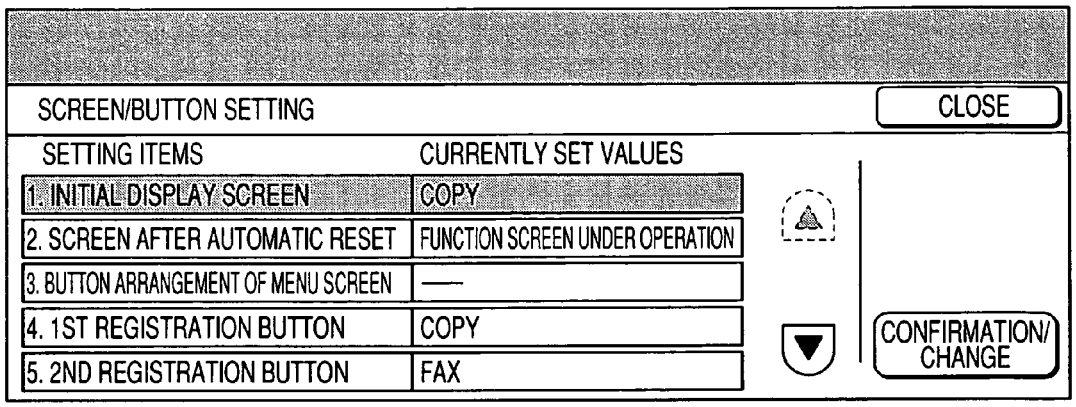
FIG. 5 is a schematic diagram illustrating an example of a setting screen used for designating the screen transition.

Next, the setting in the setting section by the user (or a machine manager) is described below. FIG. 5 is a schematic diagram illustrating an example of a setting screen used to designate the screen transition. Hereinafter, the setting of the initial display screen and the designation of the screen transition in the automatic reset mode are described. The "menu screen" and the "function screen under operation" are prepared as options for setting the screen transition after the automatic reset.

Figure 6:
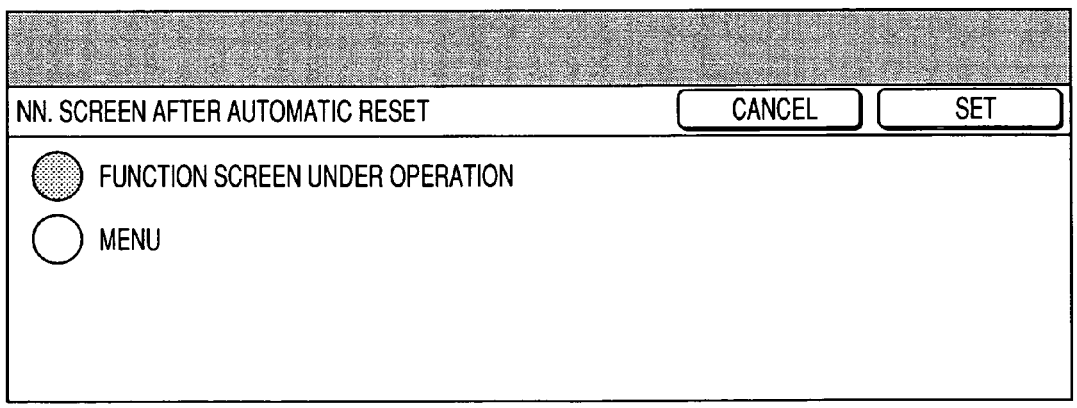
FIG. 6 is a schematic diagram illustrating an example of a setting screen used for selecting the screen transition after automatic reset.

FIG. 6 is a schematic diagram illustrating an example of a setting screen used to select the screen transition after the automatic reset. When the item "screen after the automatic reset" is selected among the setting items shown in FIG. 5, the setting screen shown in FIG. 6 is displayed. By selecting the item "function screen under operation" shown in this setting screen, the transition of the screen is made after the automatic reset to the initial screen of the function being performed before the automatic reset. Meanwhile, when the item "menu" is selected, it is designated that after the automatic reset, the transition of the screen is made to the menu screen. Incidentally, the set values are stored in the setting section 4 as the NVRAM.

Figure 7:
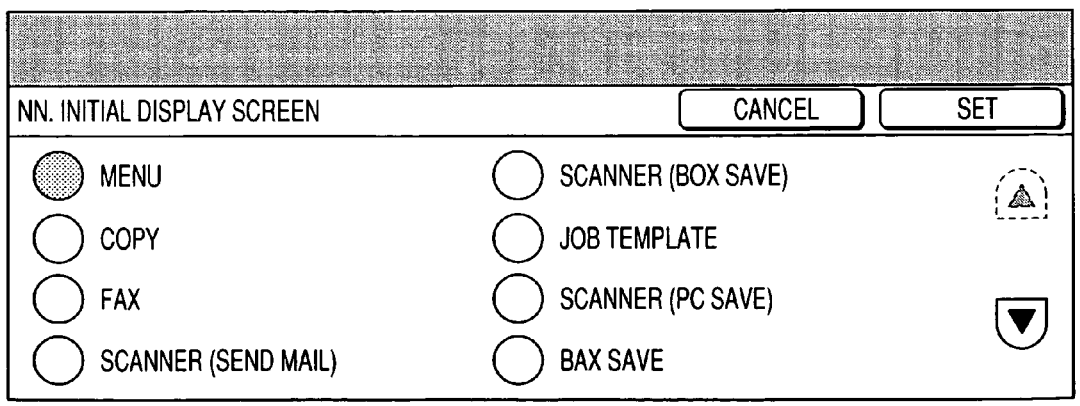
FIG. 7 is a schematic diagram illustrating an example of a setting screen used for setting an initial display screen.

FIG. 7 is a schematic diagram illustrating an example of a setting screen used for setting an initial display screen. When the item "initial display screen" is selected among the setting items shown in FIG. 5, the setting screen shown in FIG. 7 is displayed. The "menu screen" and each of the function screens such as "COPY", "SCAN" and "FAX" are prepared as options for setting the "initial display screen". If the "MENU" is selected, the "menu screen" is displayed when turning the power on or after the apparatus is put into canceling power-saving mode. On the other hand, when one of the function screens is selected, the initial screen corresponding to the selected function is displayed when turning the power on or after the apparatus is put into the canceling power-saving mode. Incidentally, the values set on this setting screen are stored in the setting section 4 as the NVRAM. Additionally, it is not always necessary to employ all the functions of the image forming apparatus as the options.

Optimal control of the screen transition can be achieved according to the usage condition and the usage frequency of a user (or a machine manager) by performing the setting of the screen by the user using the setting screen. Especially, in a case where the screen setting is not performed, the apparatus is adapted to automatically display the initial screen of the processing function being performed until immediately before the transition. Thus, the screen transition to the screen relatively suited to the usage frequency of the user is achieved without special settings. Accordingly, the usability of the user is enhanced.

As an example of specific setting of the screen, for instance, in an environment in which it is preliminarily known that all the functions of the apparatus are evenly used, it is better for users that the menu screen on which each of the functions can be selected is displayed, as compared with the case where a specific function screen is displayed. In this example, the "MENU" is selected as the initial display screen or the screen displayed after the automatic reset, instead of the various function screens and the "function screen under operation". Consequently, an operation of calling the menu screen from the specific function screen can be omitted. Thus, operability can be further enhanced.

Also, the apparatus is enabled to perform "execution of specific job memory" as an operation to be performed after the automatic reset. Thus, the automation of not only the transition of the screen to the screen corresponding to the specific function, but the setting of the function to be performed after the screen transition can be achieved.

Also, in canceling power-saving mode, the apparatus is operated according to "screen after automatic reset". Thus, even in canceling power-saving mode, the function screen being used before the transition can be displayed. Consequently, even in an environment in which the apparatus frequently enters the power-saving mode, users can start to use the machine from a screen of which frequency of usage is high. Thus, usability of the user is considerably enhanced.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An image forming apparatus that performs a plurality of functions, the image forming apparatus comprising:
   a display which displays a menu screen being used for selecting one of the plurality of functions, and which displays, upon a user's selection, a function instruction screen corresponding to a selected function;
   an operating section which accepts, from the user, an operation relating to the selected function through the function instruction screen;
   a detecting section which detects that an operation relating to a lastly selected function has not been performed for a predetermined amount of time; and
   a controller which controls to change a screen of the display to an initial screen of the function instruction screen corresponding to the lastly selected function, when the detecting section detects that the operation has not been performed for the predetermined amount of time.

2. The image forming apparatus according to claim 1, wherein the predetermined amount of time used in the detecting section is an amount of time for waiting to transit an operation mode of the image forming apparatus to an automatic reset mode in which a power saving control is not performed.

3. The image forming apparatus according to claim 1, wherein the controller executes a process in a job memory in addition to the screen transition control, the process in the job memory preliminarily being set for the function corresponding to the changed screen.

4. An image forming apparatus that performs a plurality of processing functions, the image forming apparatus comprising:
   a display which displays a menu screen being used for selecting one of the plurality of functions, and which displays, upon a user's selection, a function instruction screen corresponding to a selected function;
   an operating section which accepts, from the user, an operation relating to the selected function through the function instruction screen;
   a detecting section which detects that an operation relating to a lastly selected function has not been performed for a predetermined amount of time;
   a switching section which switches between a setting that the screen of the display is changed to the menu screen when the detecting section detects that the operation has not been performed for the predetermined amount of time and a setting that the screen of the display is changed to an initial screen of the function instruction screen corresponding to the lastly selected function when the detecting section detects that the operation has not been performed for the predetermined amount of time; and
   a controller which controls a screen transition based on any of the settings to which the switching section switches.

5. The image forming apparatus according to claim 4, wherein
   the predetermined amount of time used in the detecting section is an amount of time for waiting to transit an operation mode of the image forming apparatus to an automatic reset mode in which a power saving control is not performed.

6. The image forming apparatus according to claim 4, wherein the switching section further determines the screen to be displayed when the image forming apparatus is powered on or when an operation mode of the image forming apparatus returns from a power-saving mode to a normal mode, and
   the controller controls the screen transition based on the switching made by the switching section when the detecting section detects that the operation has not been performed for the predetermined amount of time, and when the image forming apparatus is powered on or when the operation mode returns from the power-saving mode to the normal mode.

7. The image forming apparatus according to claim 6, wherein the screen to be displayed when the operation mode returns from the power-saving mode to the normal mode is the menu screen or the initial screen of the function instruction screen corresponding to the function being selected immediately before a transition of the operation mode to the power-saving mode.

8. A screen transition control method used in an image forming apparatus that performs a plurality of functions, the screen transition control method comprising:
   displaying a menu screen on a display;
   selecting one of the plurality of functions from the menu screen;
   displaying a function instruction screen corresponding to the selected function;
   accepting an operation relating to the selected function through the function instruction screen;
   detecting that an operation relating to a lastly selected function has not been performed for a predetermined amount of time; and
   controlling to change a screen of the display to an initial screen of the function instruction screen corresponding to the lastly selected function when detecting that the operation has not been performed for the predetermined amount of time.

* * * * *